G. W. WINGLER & W. W. STOUGH.
Springs for Side-Bar Wagons.
No. 206,056. Patented July 16, 1878.
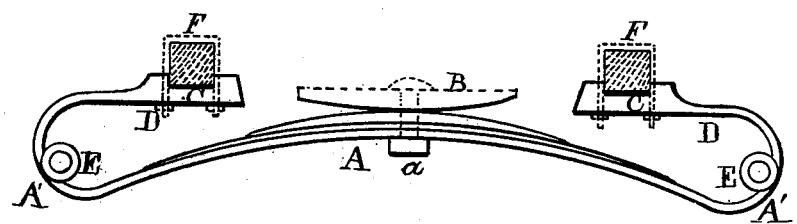

UNITED STATES PATENT OFFICE.

GEORGE W. WINGLER AND WILL W. STOUGH, OF SHIPPENSBURG, PA.

IMPROVEMENT IN SPRINGS FOR SIDE-BAR WAGONS.

Specification forming part of Letters Patent No. 206,056, dated July 16, 1878; application filed May 25, 1878.

*To all whom it may concern:*

Be it known that we, GEORGE W. WINGLER and WILL W. STOUGH, of Shippensburg, in the county of Cumberland and State of Pennsylvania, have invented certain new and useful Improvements in Springs for Vehicles; and we do hereby declare that the following is a full, clear, and exact description of the invention, which will enable others skilled in the art to which it appertains to make and use the same, reference being had to the accompanying drawing, and to letters of reference marked thereon, which form a part of this specification.

This invention relates to side-bar wagons and the manner of constructing the springs attached thereto. It has for its object the prevention of the torsion of the side bars, and also the firm attachment of the same to the spring.

It consists in a spring composed of one main and two end pieces. The end pieces are attached to the side bars, and extend outwardly and downwardly therefrom. To their lower ends the main piece is connected by an ordinary hinge-joint. By this construction, as the body of the wagon moves up and down the ends of the mainspring turn on this loose joint, and all tendency to twist the side bars is thereby avoided.

In the upper parts of the end pieces are formed recesses or seats for the reception of the side bars, which have a firm rest therein, and a steady and strong connection is insured. The use of bolts is obviated, and only a small clip need be employed to hold the bar.

The figure represents the device as attached to the side bars of a wagon.

F F are the side bars, resting in the recesses C of the end pieces D. To these is attached the mainspring A by the hinge-joints E E. Upon the mainspring A the spring-bar B is connected by a bolt, and the body of the wagon rests upon the spring-bar. As pressure is applied upon the central part or piece A it turns in the hinge-joints E E, the pieces D D yielding but slightly, and thus the side bars F remain firm and without any tendency to twist. At the same time the shoulders of the recesses C give a firm bearing for the end pieces, and they are thus held rigidly and prevented from working loose or slipping from their hold.

Having thus described our invention, what we claim is—

1. In side-bar wagons, a transverse spring whose end pieces are connected by hinge-joints to the mainspring and rigidly to the side bars.

2. The vehicle-spring composed of main piece A and end pieces D, having recesses C, in combination with the side bars of a vehicle, substantially as and for the purpose described.

In testimony that we claim the foregoing as our own we affix our signatures in presence of two witnesses.

GEORGE W. WINGLER.
WILL W. STOUGH.

Witnesses:
JOHN COFFEY,
JOHN A. WITMER.